June 7, 1966 A. P. LIMBACH 3,254,663
PRESSURE CONTROL VALVE FOR EXTRUSION APPARATUS
Filed May 8, 1963 2 Sheets-Sheet 2
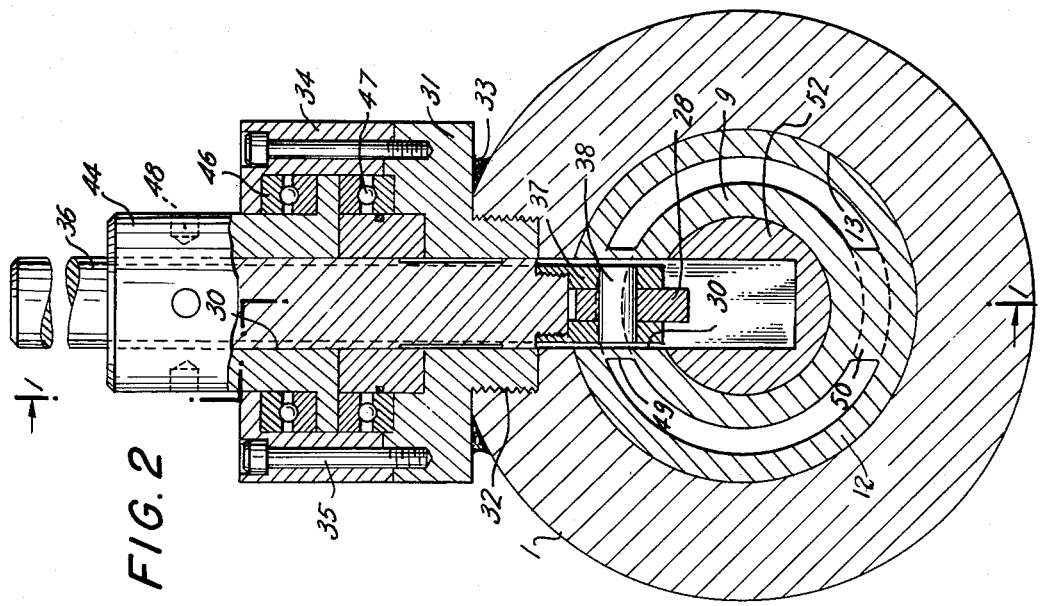
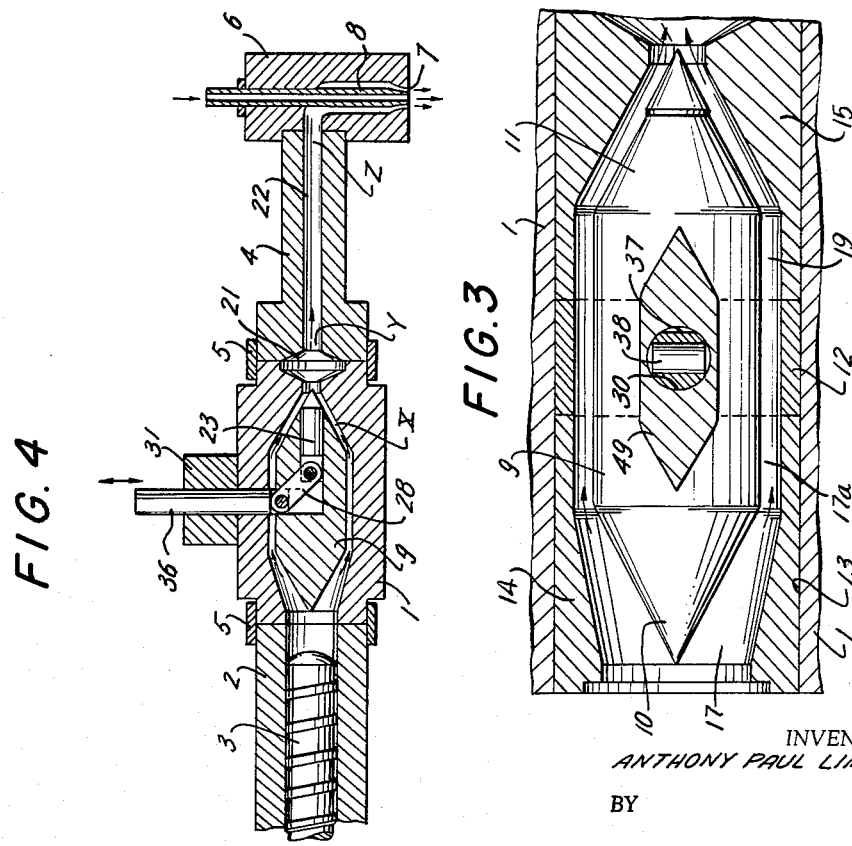
INVENTOR.
ANTHONY PAUL LIMBACH
BY
Pennie, Edmonds, Morton, Taylor & Adams
ATTORNEYS

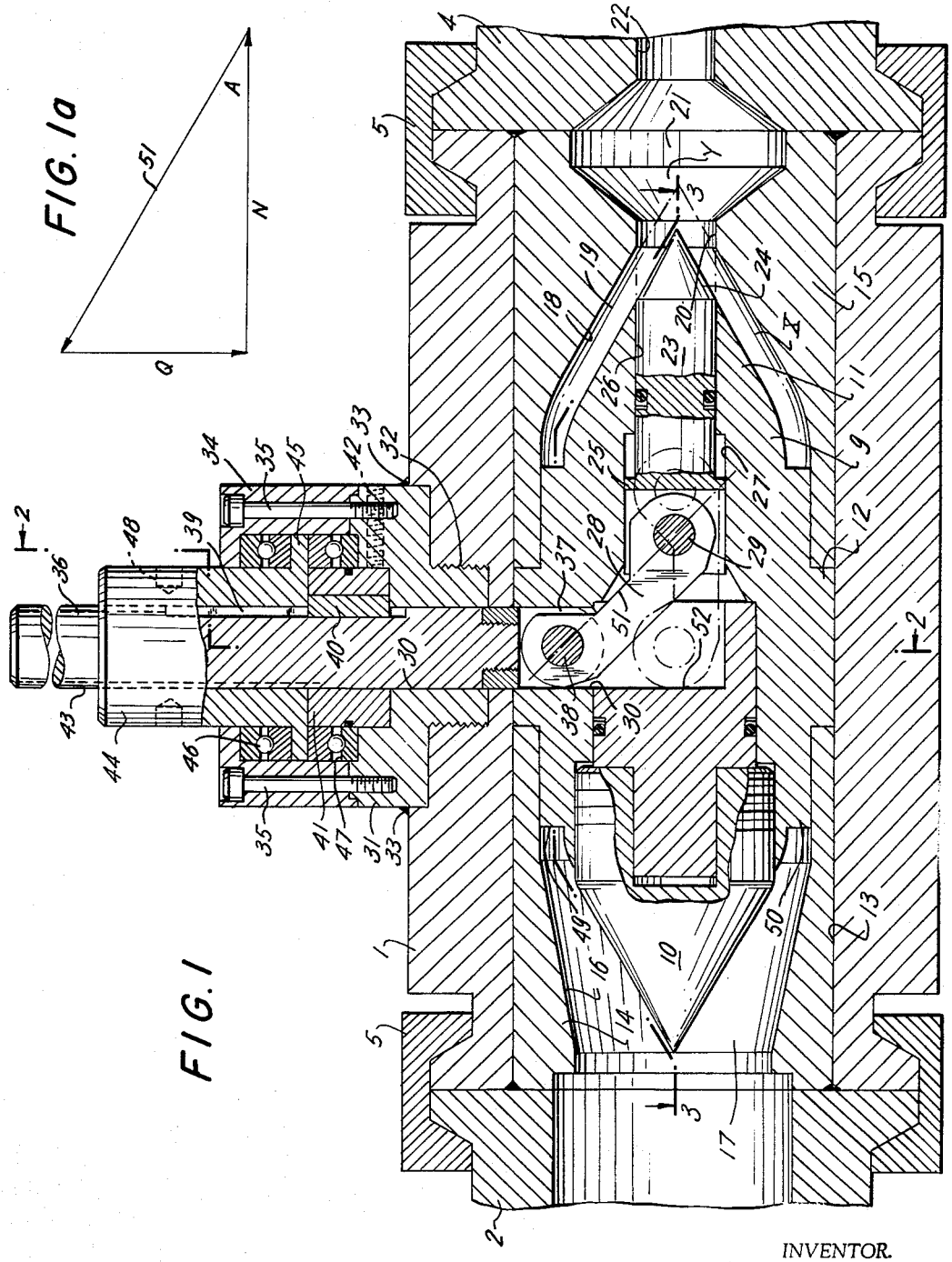

United States Patent Office 3,254,663
Patented June 7, 1966

3,254,663
PRESSURE CONTROL VALVE FOR
EXTRUSION APPARATUS
Anthony Paul Limbach, Somerset, N.J., assignor to Sterling Extruder Corporation, Linden, N.J., a corporation of New Jersey
Filed May 8, 1963, Ser. No. 278,916
3 Claims. (Cl. 137—219)

This invention relates to valves for use with extruders or organic plastic material such as plastic resins for the purpose of controlling or regulating the back pressure under which the extruder operates. It is especially useful in controlling the flow of any material the pressure of which rises with great suddenness when the flow is about to be cut off, that is, just before the valve reaches "closed" position or its position of minimal amount of flow. However, the valve may be used for controlling the flow of other materials, if desired.

The control of the back pressure in an extruder is advantageous in producing more thorough mixing of the components of the plastic material by the action of the plasticizing screw, in producing a more uniform temperature in the extruded material, and in reproducing extruded plastic material having more uniform properties.

One of the major objections to valves of this type as heretofore proposed is their poor flow characteristics, and another serious objection is that as such valves are adjusted to produce higher and higher back pressure, they require greater and greater force or loading for their operation.

The valve construction of my present invention overcomes these and other difficulties and includes a valve housing having a valve opening near the discharge end and a valve body which is supported within the housing in such a manner that the stream of plastic material surrounds the valve body as it flows towards the discharge opening. The valve body is of streamline form and the supports for the body on the interior of the valve housing are also of such form. The valve opening is a restricted one, that is, it is smaller in area than the area of the flow passage surrounding the valve body at its greatest crosswise dimension, and is smaller in diameter than the valve body. A streamlined passage is provided on the exterior of the valve body which directs the plastic material towards the restricted valve opening. The valve member comprises a valve pin which slides in an axial bore in the valve body, such bore extending from near the valve opening to the mid-section of the valve body. The valve pin is provided with a pointed or conical surface at its operating end to coact with the valve opening and form with the walls of the valve housing and the valve body a continuous streamlined passage for the plastic as it approaches the discharge opening.

For actuating the valve pin the valve housing is provided with a lateral extension at its mid-section, and a cross bore or opening, advantageously cylindrical, extends inwardly through the lateral extension, through the side of the valve housing and into the valve body where it intersects the valve pin bore. The actuating mechanism comprises an actuator shaft which is arranged to slide in the lateral opening just described and which is connected at its inner end to the inner end of the valve pin by means of a link member. The actuator shaft is prevented from rotation during its sliding movement, and force is applied thereto to move the member axially by means of a collet which is arranged in screw threaded relation to the actuator shaft. The rotation of this collet forces the actuator shaft inwardly and the link member swings downwardly from a maximum angle of about 45° with the axis of the valve member nearly to axial alignment with this member.

By this mechanism a large mechanical advantage is provided which increases as the valve pin is moved towards the valve opening to increase the throttling or back pressure effect.

The arrangement of the valve opening, the shape of the coacting end of the valve pin and of the streamlined approach channel produce an increase of velocity in the plastic material as the throttling effect is increased. Such velocity produces a Venturi effect which results in a reduction in static pressure at the sides of the moving stream of plastic material as it leaves the valve opening. That is to say, the static pressure at this point is, under most conditions, less than the static pressure downstream from the valve, and consequently the force resulting from the pressure of the plastic against the end of the valve pin is less than if the increase in velocity of the plastic were not produced.

The invention will be further understood by considering the following detailed description of one particular form of my improved valve construction as illustrated in the accompanying drawings. In these drawings:

FIG. 1 is a view in longitudinal vertical section through the improved valve;
FIG. 1a is a force diagram;
FIG. 2 is a vertical cross section taken on broken line 2—2 of FIG. 1;
FIG. 3 is a fragmentary horizontal section taken on broken line 3—3 of FIG. 1; and
FIG. 4 is a sectional view drawn to a reduced scale showing diagrammatically an extrusion apparatus or system including the improved valve construction.

Referring now to these drawings, the valve housing 1 is a hollow cylinder connected at its left end to an extruder 2 having a plasticizing screw 3, and connected at its right end to a conduit 4. These connections are made by means of conventional connecting members 5. The downstream end of conduit 4 is joined to a die head 6 (FIG. 5) having an annular die orifice 7, and, as shown, this orifice is provided with a member 8, the upper end of which may be connected to a supply of fluid under pressure for blow-moulding, if desired.

The valve body or support as shown at 9 (FIG. 3) is a generally cylindrical streamlined member having conical end portions 10 and 11 respectively and an integral cylindrical projecting waist portion 12 which fits snugly within the cylindrical inner wall 13 of valve housing 1.

Valve body member 9 is secured in position within housing 1 by means of front and rear inserts 14 and 15. These inserts are hollow cylindrical members which closely fit the wall 13 of housing 1, their inner end portions bearing against the opposite sides of the projecting waist portion 12 so as to secure valve body 9 in position in the valve housing. Inserts 14 and 15 may each be welded at their outer ends to the valve housing as indicated.

Insert 14 has an inner wall 16 in the form of a truncated cone so as to form with the surface of conical end portion 10 a streamlined entrance passage 17 for the plastic material. Similarly the insert 15 has an inner wall 18 in the form of a truncated cone which forms with the surface of conical end portion 11 of the valve body a streamlined approach passage 19 which converges to a restricted valve opening 20 formed in the outer portion of insert 15. Passages 17 and 19 are interconnected by an annular passage 17a surrounding streamlined member 9, as shown in FIG. 3. Passages 17, 17a and 19 thus form the complete flow passage through the valve. Valve opening 20 includes a short cylindrical passage which discharges into a short space 21 of larger diameter than opening 20, this space 21 being in communication with the passage 22 of conduit 4.

It will be understood that the valve is assembled by first inserting the valve body or valve support member 9 within valve housing 1 and thereafter placing the inserts 13 and 15 in position against the opposite sides of the waist portion 12 with the ends of the inserts flush with the end surfaces of the valve body. After this the welding of the inserts to the valve body at each end takes place.

The valve member is shown at 23 and its main portion is cylindrical terminating in a cone shaped end portion 24 which coacts with the cylindrical valve openings 20 to control flow as will be described later on. At its rear end valve pin 23 has an enlarged head or kunckle portion 25. Valve pin 23 slides in a cylindrical bore 26 in valve body 9, and the head portion 25 slides in an enlarged cavity 27. Kunckle portion 25 is bifurcated and receives the lower end of a connecting link 28, the parts being secured together by means of a cross pin 29. The opposite side edges of the bifurcated head or kunckle 25 fit closely the walls of cavity 27 as shown in FIG. 1.

Intersecting the aligned bores 26 and 27 at right angles and centrally of valve body 9 there is a cylindrical opening or cross bore 30 which continues outwardly through the upper wall of housing 1 and thence through an upward and lateral extension 31 of the valve housing. Extension 31 is a cylindrical member having a reduced and threaded neck 32 which is received in a threaded opening in valve housing 1, and is thereafter permanently welded to the housing as indicated at 33. Extension 31 has a cylindrical caplike portion 34 which is secured in place by cap screws 35. The purpose of this portion 34 will appear presently.

Arranged for sliding movement in cross bore 30 there is an actuator shaft 36 which at its inner or lower end has an actuator kunckle 37 which is mounted in threaded relation thereon as shown in FIGS. 1 and 2. Kunckle 37 is bifurcated and secured to link 28 by means of a cross pin 38. Longitudinal movement of the actuator shaft 36 causes through link 28 movement of valve pin 23 towards and away from valve opening 20.

In order to prevent rotation of actuator shaft 36 it is provided with a key way 39, and a key member 40 is fixed within a collar 41, key way 39 sliding with respect to key 40. Collar 41 is secured in position within extension 31 and its cap member 34 and held against rotation by means of a set screw 42.

In order to impart axial movement to actuator shaft 36 it is exteriorly threaded as shown at 43 and a collet 44 is arranged for rotative movement and has interior threads which engage threads 43. Collet 44 is flanged at its inner end at 45 and this flange has ball thrust bearings 46 and 47 above and below. These bearings are secured permanently within lateral extension 31 by means of the caplike portion 34. The upper cylindrical portion of collet 44 is provided with a series apertures 48 to receive a suitable wrench for turning the collet.

The streamlined valve body member 9 is provided with upper and lower spacers or supports 49 and 50, both streamlined at both ends. The cross bore or cylindrical opening 30 passes through the upper support 49, and the lower support 50 serves to take the thrust of the downward movement of actuator shaft 36.

In the operation of the valve, assuming actuator shaft 36 is in its uppermost position, when the actuator collect 44 is turned the shaft is moved downwardly and this motion will be transmitted through the angular link 28 to the valve pin 23 causing it to slide toward valve opening 20. As this movement continues the axis of link 28, which is indicated by line 51, will move gradually in the direction of alignment with the axis of valve pin 23. In its uppermost position the axis 51 is at an angle of approximately 45° to the valve pin axis, and in its lowest position it is nearly in alignment with the valve pin. The thrust of the actuator knuckle 37 towards the left in FIG. 1 is taken by the surface of a thrust block 52, the working surface of which is in vertical alignment with a plane tangent to the left-hand wall of bore 30 as shown in FIG. 1.

When the valve is not used to control the flow of plastic material from an extruder, but is used to control the flow of a material which has similar physical and flow characteristics, to that of plastic material issuing from an extruder and rendered flowable by plasticizing and raising its temperature, as valve pin 23 moves towards its minimal position and the axis 51 of linkage 28 approaches alignment with the axis of valve pin 23 a sudden and intense increase of pressure of the plastic material will occur. During this approaching movement, although the operating shaft 36 may move inwardly at a constant velocity, the velocity of the valve pin will continually decrease and the extent of its movement will continually decrease. A comparatively large movement of the operating shaft 36 will produce an extremely small movement of the valve pin. This greatly improves the ability to control the pressure of the plastic material.

When valve pin 23 is moved towards closed position the opening between the conical end portion 24 and inner wall 18 of the approach passage 19 is reduced so that the plastic must flow through a smaller opening. Consequently the pressure in passage 18, indicated by X, (FIG. 1) will increase and the velocity of the plastic material flowing through the valve opening 20 will increase. This develops a pressure head in the flowing material which tends to push the material forward away from the valve pin. Thus the force acting on the valve pin can only be proportional to the static pressure at the point Y in front of the valve pin, and this pressure will not change with the back pressure X.

The high velocity of the stream directly in front of the valve pin produces static pressures at the point Y which are lower than the static presures at a distance downstream from point Y, for example, at the point Z (FIG. 4), which is substantially the die orifice pressure. Thus the front of the valve pin is exposed only to pressures in conduit 22 and the operation of the valve, that is, the movement of the valve pin will not be affected by increase in the back pressure at X. Such back pressure acting only on the sides of the valve pin produces no force tending to urge the valve pin towards the left.

Referring to the force diagram shown in FIG. 1a, the force acting downwardly through the actuator shaft is represented by the vector Q, and the angle which the link axis 51 makes with the axis of valve pin 23 is indicated by the letter A. The force acting on valve pin 24 is indicated by the vector N. The greatest force will be applied to the valve pin as angle A becomes 0, but as a practical example of the valve operation let us assume that angle A is 5°. The tan of 5° is .0871 and tan $^{-1}$ A is 11.5. Thus N=11.5 X Q. Hence the mechanical advantage when angle A is 5° is 11.5. As a corollary of this, the operating mechanism of the valve produces extremely small (almost microscopic) movement of valve pin 23 as it approaches the position of minimal flow, whereas the extent of movement of the operating actuator shaft 36 is relatively large and the required operating force is moderate. The opposite is also true, that is, when the valve pin 23 moves in the opposite direction and approaches the maximum opening, the valve actuating mechanism provides for relatively great movement of valve pin 23.

A second mechanical advantage is obtained through the threaded connection between the actuator collet 44 and actuator shaft 36. One rotation of the collet moves shaft 36 a distance .0625 inch. This is a mechanical advantage of $$\frac{\pi 2L}{.0625}=Z$$

For a 10 inch wrench, L=10, and hence Z=1000. Thus the overall mechanical advantage of the system is 1000

X 11.5=11,500, assuming link 28 is at the 5° position. Thus, theoretically a 1 lb. force applied at the end of a 10 inch wrench could exert a force of 11,500 lbs. on the valve pin.

The improved valve has no rotating inner parts to require periodical servicing, there being only one rotating part, namely, the actuator collet 44, and this is located externally of the valve body. In this valve mechanism, moreover, the part which produces the throttling or pressure control, that is, valve pin 23, is subject only to operating force from the pressures downstream of the valve.

I claim:

1. In a pressure control valve having a housing which has a flow passage the inlet and outlet openings of which are on a common axis, the flow passage terminating in a valve opening near the outlet, a streamlined member mounted within the valve housing, streamlined spacers securing such member to the housing and positioning it centrally of the flow passage, a valve member slidably supported by the streamlined member, one end of the valve member cooperating with the valve opening, an actuator shaft for the valve member which projects through a bore extending outwardly from the streamlined member through one of the spacers, and means for moving the actuator shaft inwardly and outwardly to adjust the position of the valve member with respect to the valve opening, the improvement in combination therewith which comprises:

(a) a first bifurcated knuckle member on the opposite end of the valve member from the valve opening, (b) the streamlined member having a cavity the opposite walls of which closely fit the opposite edges of the knuckle member, (c) the side bore for the actuator shaft extending at right angles to the common axis of the valve flow passage, and the bore in the streamlined member, (d) an actuator shaft mounted for sliding movement in the side bore, (e) a second bifurcated knuckle member secured to the inner end of the actuator shaft, the sides of such knuckle having rounded edges, (f) a thrust block mounted within the stream-lined member opposite the cavity therein and having a surface which is in alignment with the adjacent wall of the bore for the actuator shaft, (g) a pair of cross pins, one carried in a closely fitting aperture in the second knuckle member and the other carried in a closely fitting aperture in the first knuckle member, (h) a link member interconnecting said pins and having apertures closely fitting each of these pins, and (i) the end of the link member in the knuckle having a rounded surface closely contacting the surface of the thrust block and thereby forcing the valve member towards the valve opening during the final movement of the link member by actuator shaft.

2. The pressure control valve of claim 1 wherein said housing contains a hollow cylindrical bore.

3. The pressure control valve of claim 2 wherein said valve body carries a waist portion extending around its periphery and located at its longitudinal center, said waist portion in engagement with the cylindrical bore, and wherein a pair of assembly members are positioned on each side of the waist portion in contact with the cylindrical bore and adapted to engage the side edges of the waist portion.

References Cited by the Examiner

UNITED STATES PATENTS

| | | | |
|---|---|---|---|
| 1,001,130 | 8/1911 | Faller | 251—280 |
| 2,442,625 | 6/1948 | Thomas | 137—219 |
| 2,972,359 | 2/1961 | Joukainen et al. | |
| 3,050,084 | 8/1962 | Palfey. | |
| 3,093,861 | 6/1963 | Rex. | |

FOREIGN PATENTS

| | | |
|---|---|---|
| 773,035 | 8/1934 | France. |
| 645,873 | 6/1937 | Germany. |
| 714,618 | 12/1941 | Germany. |
| 1,091,824 | 10/1960 | Germany. |

OTHER REFERENCES

Griff, A. L. Plastics Extrusion Technology, Reinhold Publishing Corp., 1962. Page 4.

M. CARY NELSON, *Primary Examiner.*

MICHAEL V. BRINDISI, *Examiner.*